Patented Dec. 22, 1942

2,305,910

UNITED STATES PATENT OFFICE 2,305,910

METHOD OF DRAFTING

Clarence P. Taylor, Manhattan Beach, Calif.

No Drawing. Application March 24, 1941,
Serial No. 384,953

5 Claims. (Cl. 281—43)

This invention relates to a scum removing powder, and is used particularly by draftsmen, engineers, artists, architects, and the like. The purpose of my novel composition of matter is to produce a substance which will prevent drawings from being smudged, or otherwise unsightly, and not clear, due to the collection of scum or grime on the surface of the drawing.

Engineering, architectural and artistic drawings are usually prepared first in pencil on suitable paper, and frequently it is desirable to prepare these drawings on a transparent paper known as vellum, from which blueprints can be taken, thus saving the cost of ink tracings which are costly, and require considerable time to prepare.

Scum may be defined as the smudge or grime on the surface of a drawing caused by accumulated dirt or pencil powder, which is graphite, this material being carried over the surface of the paper creating dark areas which are not only unsightly but obscure the drawing, and prevent it from being sharp and clear, which is desirable, particularly in engineering and architectural drawings.

An object of my invention is to provide a composition of matter which is inexpensive, which is simply and easily applied, and which will effectively prevent the accumulation of scum on pencil drawings during the time that the drawing is being prepared, and even subsequently while it is being used.

Another object of my invention is to provide a novel composition of matter of the character stated, which will not dim or erase the pencil lines on the drawing, but will show these lines more clearly than in practices heretofore in use.

A feature of my invention is the pastel color of the composition of matter, the color contrasting with the black and white of the drawing so that fine marks and dots can be readily distinguished. As is well known, an engineer or architect uses triangles, a T-square, a straight edge, a scale, and the like, while working on the drawing, and in moving these instruments over the drawing dirt is spread over the surface of the paper, as well as the graphite from the pencil, causing a smudge or scum to be placed on the drawing. My scum removing powder consists of finely ground rubber, and this rubber shall preferably not be pure gum, but contains some adulterant, however little sulphur should be employed, due to the fact that the rubber must not be abrasive. The rubber which I use might be the ordinary type of eraser rubber, art gum or neoprene. In fineness the rubber shall preferably pass a thirty mesh screen, and be held on a two hundred mesh screen. The rubber is ground, macerated, pulverized, or otherwise finely divided, and the particles of the powdered rubber shall preferably be very irregular and rough as to their surface so that as the powdered rubber is rolled or worked over the surface of the paper the small particles of the rubber will pick up dirt, graphite, and the like, and will retain these particles of dirt and graphite due to the rough or irregular surface of the rubber particle.

To prevent the rubber particles from adhering I preferably add about ten per cent by-weight of a fine talc, whiting, fuller's earth or bentonite, the talc is thoroughly mixed with the rubber, and serves as a lubricant to reduce friction between the particles of the rubber, and between the rubber particles and the instruments which are used by the draftsman.

In operation my scum removing powder is sprinkled lightly over the entire surface of the drawing. The draftsman then proceeds to work on the surface of the paper preparing his drawing, and using the various instruments. The triangles, T-squares, and the like, are spaced slightly from the surface of the paper due to the powder, and also as the various instruments are moved over the surface of the drawing the friction against the paper, and against the bottom of the instruments causes the particles of the powdered rubber to roll, thus enveloping the dirt and graphite particles. The powder is preferably colored a pastel shade, such as pink, yellow or green, which contrasts with the black and white of the drawing, thus enabling the draftsman to see fine marks and dots on the surface of the drawing. In actual use I have found that the surface of the drawing is kept entirely clear of scum or grime, as are also the surfaces of the instruments which are being used, and furthermore there is no difficulty in using the various instruments due to the fact that the powder is sufficiently fine so that there is no appreciable packing of the material between the edges of straight edge and a triangle. The powder will not erase lines which are placed on the drawing paper, nor will it cause the drawing to fade or otherwise affect pencil lines. The powder is placed over the entire surface of the drawing, as previously stated, and remains there while the drawing is prepared, the pencil lines being made through the powder. Even though a soft pencil is used, the lines will not smudge due to the movement of the instruments, or the workman's hand, the reason being that the powder spaces the instruments or the hand from the pencil line which is drawn, thus preventing the particles of graphite from being pushed over the surface of the paper to create a smudge.

The process of preparing rubber consists in first grinding, powdering or macerating the rubber into fine particles which have a rough and irregular exterior surface. The rubber contains no abrasive or extreme hardening adulterant, but has the original consistency of the average pencil eraser. A quantity of fine talc is then added, the amount of talc being approximately ten per cent by weight; the powdered rubber is screened so as to pass a thirty mesh screen, and is held on a two hundred mesh screen. The powder is then boxed in relatively small paper boxes, and is ready for use by the draftsman in the manner previously set forth.

Having described my invention I claim:

1. The method of drafting to prevent scum accumulation on drawing paper comprising placing a quantity of ground rubber on the drawing paper, the particles of ground rubber having a rough and irregular exterior surface.

2. The method of drafting to prevent scum accumulation on drawing paper comprising placing a quantity of ground rubber on the drawing paper, the particles of ground rubber having a rough and irregular exterior surface, the ground rubber including a quantity of fine talc.

3. The method of drafting to prevent scum accumulation on drawing paper comprising placing a quantity of ground rubber on the drawing paper, the particles of ground rubber having a rough and irregular exterior surface, the rubber being so ground as to pass a 30-mesh screen and is retained on a 200-mesh screen.

4. The method of drafting to prevent scum accumulation on drawing paper comprising placing a quantity of ground rubber on the drawing paper, the particles of ground rubber having a rough and irregular exterior surface, the rubber particles being colored a pastel shade.

5. The method of drafting to prevent scum accumulation on drawing paper comprising placing a quantity of ground rubber on the drawing paper, the particles of ground rubber having a rough and irregular exterior surface, the ground rubber including a quantity of fine talc, the rubber particles being colored a pastel shade.

CLARENCE P. TAYLOR.